United States Patent
Munyon

(10) Patent No.: US 9,902,570 B1
(45) Date of Patent: Feb. 27, 2018

(54) CANISTER DELIVERY SYSTEM

(71) Applicant: Paul Munyon, Port Saint Lucie, FL (US)

(72) Inventor: Paul Munyon, Port Saint Lucie, FL (US)

(*) Notice: Subject to any disclaimer, the term of this patent is extended or adjusted under 35 U.S.C. 154(b) by 0 days.

(21) Appl. No.: 15/298,785

(22) Filed: Oct. 20, 2016

(51) Int. Cl.
   *B65G 51/26* (2006.01)
   *B65G 51/04* (2006.01)

(52) U.S. Cl.
   CPC .......... *B65G 51/26* (2013.01); *B65G 51/04* (2013.01)

(58) Field of Classification Search
   CPC ........ B65G 51/26; B65G 51/28; B65G 51/30; B65G 51/32
   USPC .......................................... 406/110, 111, 112
   See application file for complete search history.

(56) References Cited

U.S. PATENT DOCUMENTS

| | | | | |
|---|---|---|---|---|
| 3,599,898 A | * | 8/1971 | Bontempelli | B65G 51/04 186/35 |
| 3,610,554 A | * | 10/1971 | Schwarz | B65G 53/56 406/112 |
| 3,985,316 A | * | 10/1976 | Weissmuller | B65G 51/26 406/110 |
| 4,059,246 A | * | 11/1977 | Anders | B65G 51/04 181/200 |
| 4,256,418 A | | 3/1981 | Stangl | |
| 4,352,603 A | * | 10/1982 | Anders | B65G 51/30 406/112 |
| 4,455,112 A | | 6/1984 | Anders | |
| 4,459,069 A | * | 7/1984 | Ahr | B65G 51/32 406/110 |
| 4,462,721 A | * | 7/1984 | Anders | B65G 51/30 406/112 |
| 4,661,026 A | * | 4/1987 | Carlier | B65G 51/32 406/112 |
| 5,131,792 A | * | 7/1992 | Grosswiller | B65G 51/26 406/111 |
| 5,209,609 A | | 5/1993 | Lang | |
| D341,014 S | | 11/1993 | Grosswiller et al. | |
| 5,356,243 A | * | 10/1994 | Vogel | B65G 51/26 406/112 |
| 5,368,417 A | * | 11/1994 | Benjamin | B65G 51/26 232/43.1 |
| 5,473,114 A | | 12/1995 | Vogel | |
| 5,725,124 A | * | 3/1998 | Bustos | E04H 3/02 221/211 |
| 6,146,057 A | | 11/2000 | Gromley | |
| 7,234,898 B2 | | 6/2007 | Brown | |

(Continued)

Primary Examiner — Joseph A Dillon, Jr.

(57) ABSTRACT

A canister delivery system includes a vacuum unit. The vacuum unit includes a tube, a canister receiving cylinder and a canister that is slidably positioned within the tube. The vacuum unit selectively urges the canister in the tube. Thus, the canister is selectively delivered into and drawn out of the canister receiving cylinder. The canister is selectively removed from the canister receiving cylinder. The tube is vertically oriented in a vehicle drive through and the canister receiving cylinder is aligned with a vehicle. An extension unit is coupled to the tube. The extension unit selectively extends the canister receiving cylinder outwardly from the tube when the canister is delivered into the canister receiving cylinder. Thus, the extension unit positions the canister receiving cylinder within reach of the vehicle.

9 Claims, 5 Drawing Sheets

(56) References Cited

U.S. PATENT DOCUMENTS

| | | | | |
|---|---|---|---|---|
| 7,314,337 B1 * | 1/2008 | Gromley | ................ | B65G 51/26 |
| | | | | 406/110 |
| 8,322,601 B1 * | 12/2012 | Benore | ................ | G07G 1/0018 |
| | | | | 109/19 |
| 9,499,354 B2 * | 11/2016 | Jones | .................... | B65G 51/42 |

* cited by examiner

US 9,902,570 B1

CANISTER DELIVERY SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to delivery devices and more particularly pertains to a new delivery device for enhancing reaching a cylinder at a bank drive through from a vehicle.

BRIEF SUMMARY OF THE INVENTION

An embodiment of the disclosure meets the needs presented above by generally comprising a vacuum unit. The vacuum unit includes a tube, a canister receiving cylinder and a canister that is slidably positioned within the tube. The vacuum unit selectively urges the canister in the tube. Thus, the canister is selectively delivered into and drawn out of the canister receiving cylinder. The canister is selectively removed from the canister receiving cylinder. The tube is vertically oriented in a vehicle drive through and the canister receiving cylinder is aligned with a vehicle. An extension unit is coupled to the tube. The extension unit selectively extends the canister receiving cylinder outwardly from the tube when the canister is delivered into the canister receiving cylinder. Thus, the extension unit positions the canister receiving cylinder within reach of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
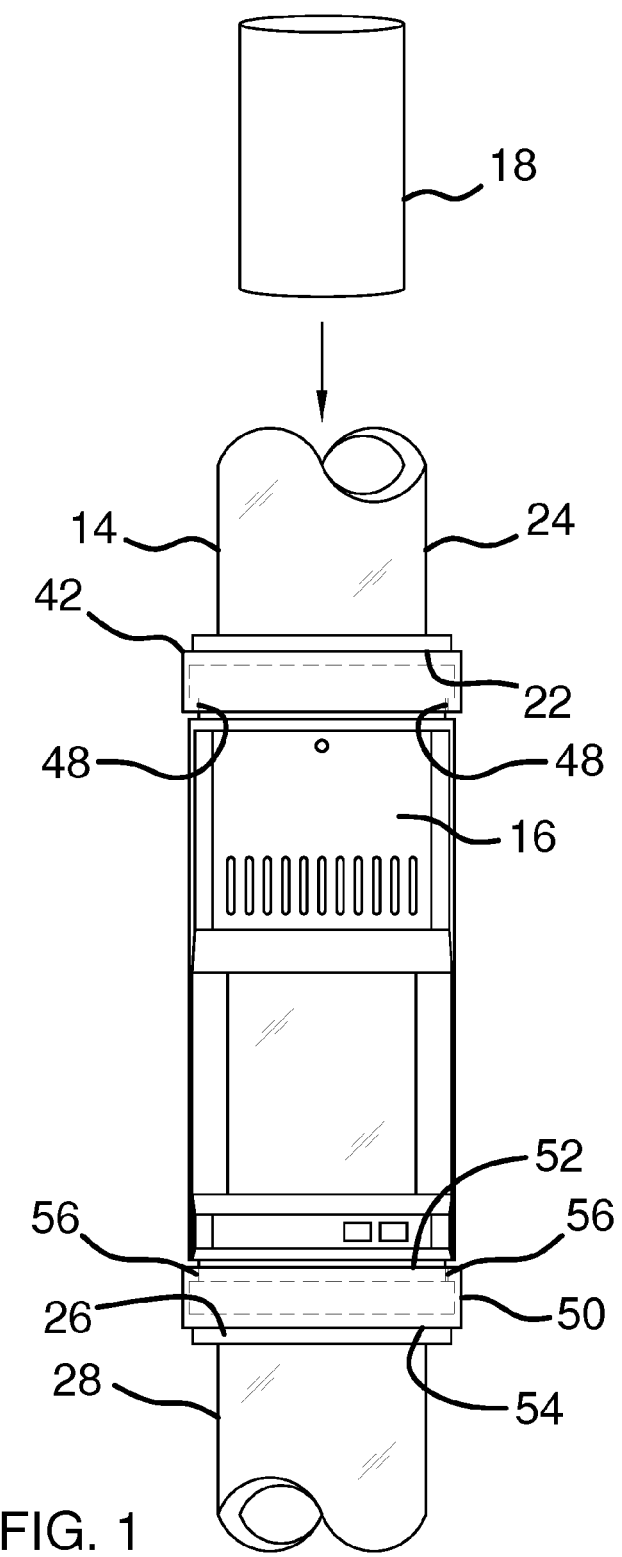
FIG. 1 is a front view of a canister delivery system according to an embodiment of the disclosure.
Figure 2:
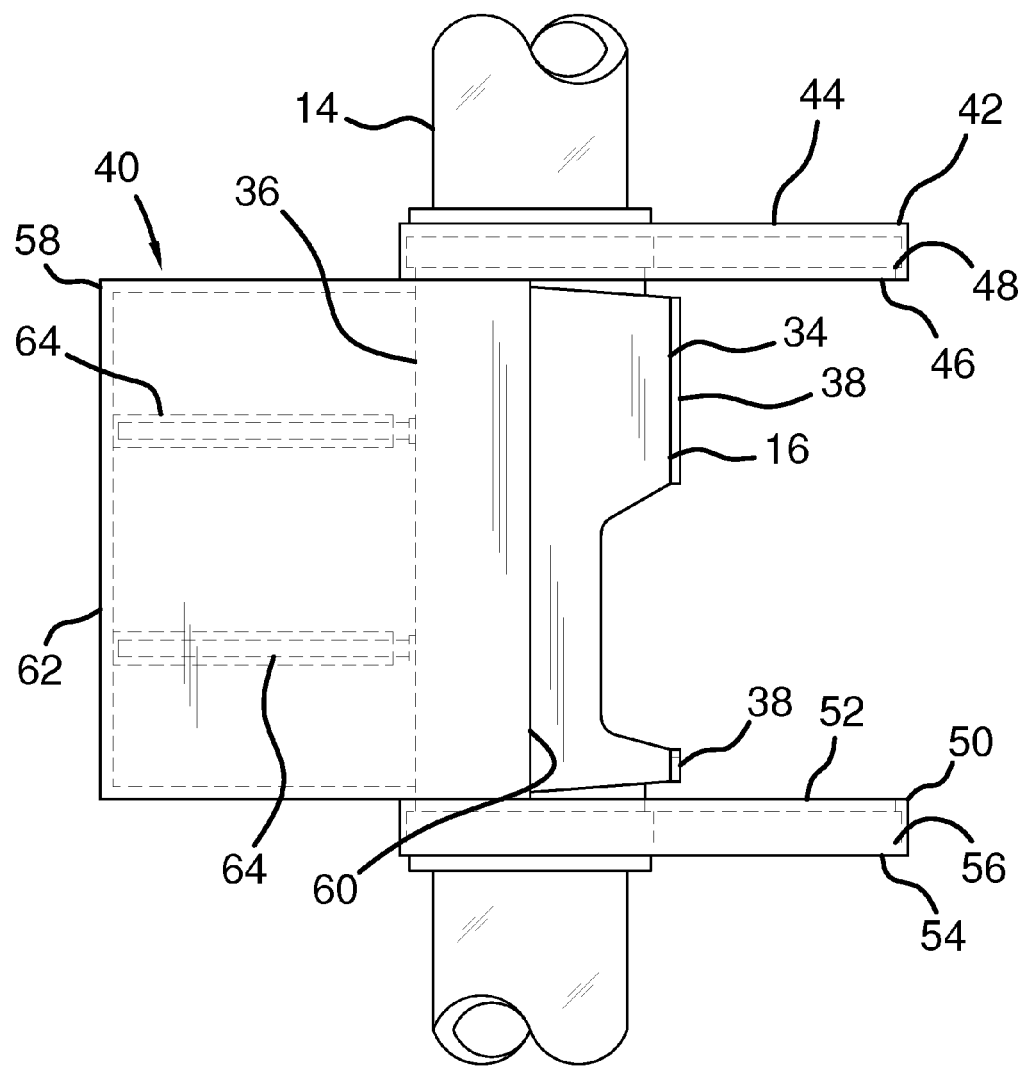
FIG. 2 is a right side phantom view of an embodiment of the disclosure showing a canister receiving cylinder being positioned in an extended position.
Figure 3:
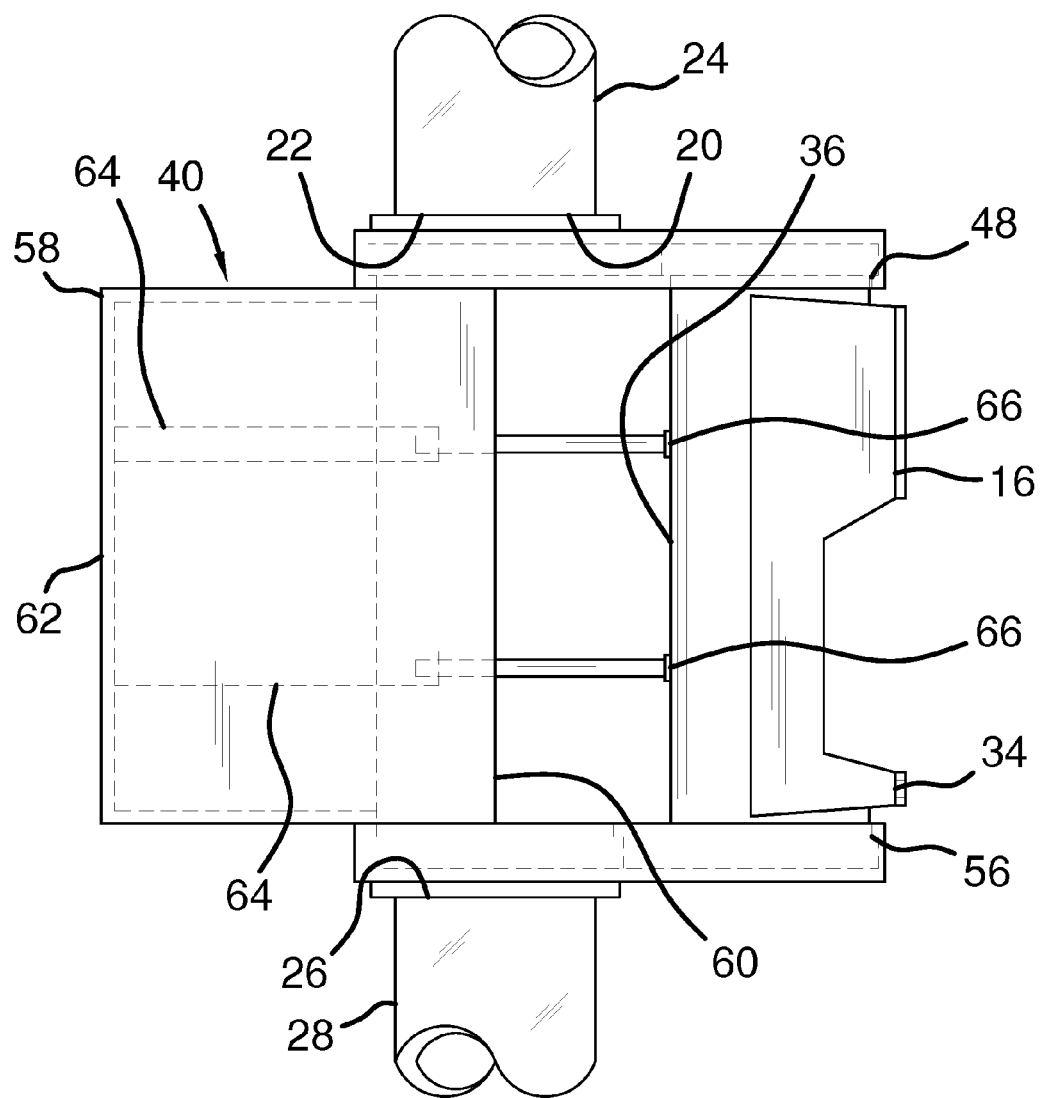
FIG. 3 is a right side phantom view of an embodiment of the disclosure showing a canister receiving cylinder being positioned in a retracted position.
Figure 4:
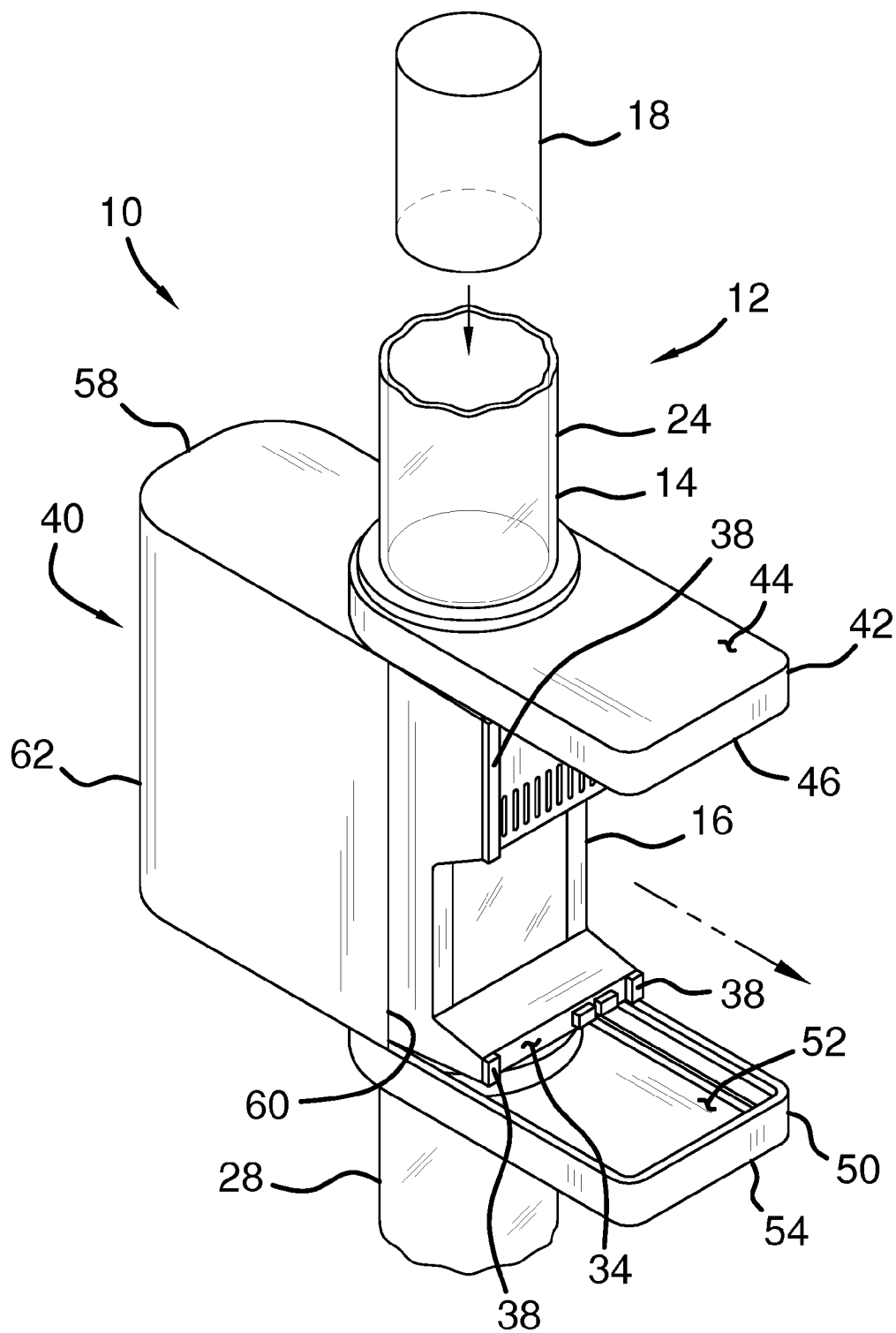
FIG. 4 is a top perspective view of an embodiment of the disclosure.
Figure 5:
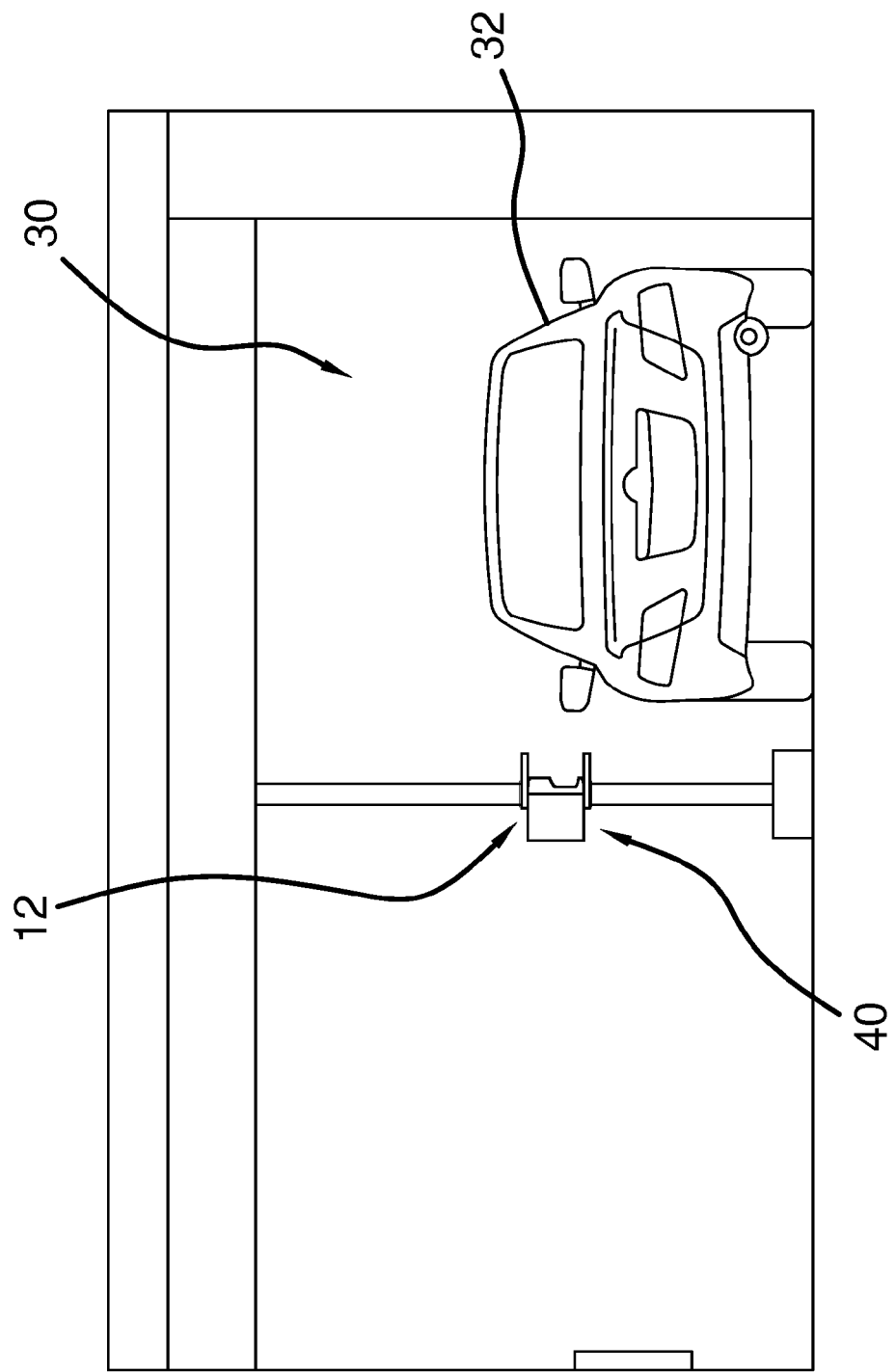
FIG. 5 is a perspective in-use view of an embodiment of the disclosure.

With reference now to the drawings, and in particular to FIGS. 1 through 5 thereof, a new delivery device embodying the principles and concepts of an embodiment of the disclosure and generally designated by the reference numeral 10 will be described.

As best illustrated in FIGS. 1 through 5, the canister delivery system 10 generally comprises a vacuum unit 12. The vacuum unit 12 includes a tube 14, a canister receiving cylinder 16 and a canister 18 that is slidably positioned within the tube 14. The vacuum unit 12 selectively urges the canister 18 in and out of the canister receiving cylinder 16. The canister 18 is selectively removed from the canister receiving cylinder 16.

The tube 14 has a cut 20 therein to define a first end 22 of a first half 24 and a second end 26 of a second half 28 of the tube 14. The canister receiving cylinder 16 is positioned to extend between the first half 24 and the second half 28. Moreover, the tube 14 is vertically oriented in a vehicle drive through 30. Thus, the canister receiving cylinder 16 is aligned with a vehicle 32 when the vehicle 32 is in the vehicle drive through 30. The vacuum unit 12 may be a document delivery system at a bank drive through or the like. The canister receiving cylinder 16 has a forwardly facing surface 34 and a rearwardly facing surface 36.

A plurality of bumpers 38 is provided. Each of the bumpers 38 is coupled to the forwardly facing surface 34 of the canister receiving cylinder 16. Moreover, each of the bumpers 38 is comprised of a resiliently compressible material. Thus, each of the bumpers 38 inhibit the forwardly facing surface 34 from frictionally engaging the vehicle 32.

An extension unit 40 is provided and the extension unit 40 is coupled to the tube 14. The extension unit 40 electrically coupled to the vacuum unit 12. Thus, the extension unit 40 may be controlled from inside the bank or the like. The extension unit 40 selectively extends the canister receiving cylinder 16 outwardly from the tube 14 when the canister 18 is delivered into the canister receiving cylinder 16. Thus, the extension unit 40 positions the canister receiving cylinder 16 within reach of the vehicle 32.

The extension unit 40 comprises a first plate 42 that has a top surface 44 and a bottom surface 46. The first end 22 corresponding to the first half 24 of the tube 14 extends through the top surface 44 and the bottom surface 46. The first plate 42 extends forwardly away from the tube 14. A pair of first tracks 48 is provided and each of the first tracks 48 is coupled to the bottom surface 46 of the first plate 42. The first tracks 48 extend forwardly away from the tube 14. The canister receiving cylinder 16 slidably engages each of the first tracks 48.

A second plate 50 is provided and the second plate 50 has an upper surface 52 and a lower surface 54. The second end 26 corresponding to the second half 28 of the tube 14 extends through the lower surface 54 and the upper surface 52. The second plate 50 is aligned with and is spaced from the first plate 42. A pair of second tracks 56 is provided and each of the second tracks 56 is coupled to the upper surface 52 of the second plate 50. The second tracks 56 are aligned with and are coextensive with the first tracks 48. The canister receiving cylinder 16 slidably engages each of the second tracks 56.

A housing 58 is provided. The housing 58 is coupled between each of the first plate 42 and the second plate 50. The housing 58 extends rearwardly away from the tube 14. The housing 58 has a front side 60 and a back side 62.

A pair of pistons 64 is provided and each of the pistons 64 is positioned within the housing 58. Each of the pistons 64 is coupled to the back side 62 of the housing 58. Moreover, each of the pistons 64 has a distal end 66 with respect to the back side 62. The distal end 66 corresponding to each of the pistons 64 is coupled to the rearwardly facing surface 36 of the canister receiving cylinder 16.

Each of the pistons 64 selectively urges the canister receiving cylinder 16 forwardly on each of the first plate 42 and the second plate 50. Each of the pistons 64 selectively urges the canister receiving cylinder 16 rearwardly on each of the first plate 42 and the second plate 50. Thus, the canister receiving cylinder 16 is aligned with the tube 14. Each of the pistons 64 is controlled by a bank teller or other individual inside the bank. The extension unit 40 may be an integral component of the vacuum unit 12. Additionally, the extension unit 40 may be retrofitted onto an existing vacuum unit 12.

In use, the vehicle 32 drives into the vehicle drive through 30 to conduct business at the bank. Each of the pistons 64 is selectively actuated to extend the canister receiving cylinder 16 toward the vehicle 32. Thus, a driver of the vehicle 32 may reach the canister receiving cylinder 16 with having to exit the vehicle 32. Each of the pistons 64 is selectively actuated to retract the canister receiving cylinder 16 away from the vehicle 32. Thus, the vacuum unit 12 may urge the cylinder into and out of the canister receiving cylinder 16.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A canister delivery system comprising:
    a vacuum unit comprising a tube, a canister receiving cylinder and a canister being slidably positioned within said tube, said vacuum unit selectively urging said canister in said tube such that said canister is selectively delivered into and drawn out of said canister receiving cylinder, said canister being selectively removed from said canister receiving cylinder, said tube having a cut therein to define a first end of a first half and a second end of a second half of said tube, said canister receiving cylinder being positioned to extend between said first half and said second half, said tube being vertically oriented in a vehicle drive through wherein said canister receiving cylinder is configured to be aligned with a vehicle; and
    an extension unit being coupled to said tube, said extension unit selectively extending said canister receiving cylinder outwardly from said tube when said canister is delivered into said canister receiving cylinder wherein said extension unit is configured to position said canister receiving cylinder within reach of the vehicle, said extension unit comprises a first plate having a top surface and a bottom surface, said first end corresponding to said first half of said tube extending through said top surface and said bottom surface, said first plate extending forwardly away from said tube.

2. The system according to claim 1, further comprising:
    said canister receiving cylinder having a forwardly facing surface and a rearwardly facing surface; and
    a plurality of bumpers, each of said bumpers being coupled to said forwardly facing surface of said canister receiving cylinder wherein each of said bumpers is configured to inhibit said outwardly facing surface from frictionally engaging the vehicle.

3. The system according to claim 1, further comprising a pair of first tracks, each of said first tracks being coupled to said bottom surface of said first plate, said first tracks extending forwardly away from said tube, said canister receiving cylinder slidably engaging each of said first tracks.

4. The system according to claim 3, further comprising a second plate having an upper surface and a lower surface, said second end corresponding to said second half of said tube extending through said lower surface and said upper surface, said second plate being aligned with and being spaced from said first plate.

5. The system according to claim 4, further comprising a pair of second tracks, each of said second tracks being coupled to said upper surface of said second plate, said second tracks being aligned with and being coextensive with said first tracks, said canister receiving cylinder slidably engaging each of said second tracks.

6. The system according to claim 1, further comprising:
    a first plate;
    a second plate; and
    a housing being coupled between each of said first plate and said second plate, said housing extending rearwardly away from said tube, said housing having a front side and a back side.

7. The system according to claim 6, further comprising a pair of pistons, each of said pistons being positioned within said housing, each of said pistons being coupled to said back side, each of said pistons having a distal end with respect to said back side, said distal end corresponding to each of said pistons being coupled to said rearwardly facing surface of said canister receiving cylinder.

8. A canister delivery system comprising:
a vacuum unit comprising a tube, a canister receiving cylinder and a canister being slidably positioned within said tube, said vacuum unit selectively urging said canister in said tube such that said canister is selectively delivered into and drawn out of said canister receiving cylinder, said canister being selectively removed from said canister receiving cylinder, said tube having a cut therein to define a first end of a first half and a second end of a second half of said tube, said canister receiving cylinder being positioned to extend between said first half and said second half, said tube being vertically oriented in a vehicle drive through wherein said canister receiving cylinder is configured to be aligned with a vehicle;
an extension unit being coupled to said tube, said extension unit selectively extending said canister receiving cylinder outwardly from said tube when said canister is delivered into said canister receiving cylinder wherein said extension unit is configured to position said canister receiving cylinder within reach of the vehicle;
a first plate;
a second plate;
a housing being coupled between each of said first plate and said second plate, said housing extending rearwardly away from said tube, said housing having a front side and a back side;
a pair of pistons, each of said pistons being positioned within said housing, each of said pistons being coupled to said back side, each of said pistons having a distal end with respect to said back side, said distal end corresponding to each of said pistons being coupled to said rearwardly facing surface of said canister receiving cylinder; and
wherein each of said pistons selectively urges said canister receiving cylinder forwardly on each of said first plate and said second plate, each of said pistons selectively urging said canister receiving cylinder rearwardly on each of said first plate and said second plate such that said canister receiving cylinder is aligned with said tube.

9. A canister delivery system comprising:
a vacuum unit comprising a tube, a canister receiving cylinder and a canister being slidably positioned within said tube, said vacuum unit selectively urging said canister in said tube such that said canister is selectively delivered into and drawn out of said canister receiving cylinder, said canister being selectively removed from said canister receiving cylinder, said tube having a cut therein to define a first end of a first half and a second end of a second half of said tube, said canister receiving cylinder being positioned to extend between said first half and said second half, said tube being vertically oriented in a vehicle drive through wherein said canister receiving cylinder is configured to be aligned with a vehicle, said canister receiving cylinder having a forwardly facing surface and a rearwardly facing surface;
a plurality of bumpers, each of said bumpers being coupled to said forwardly facing surface of said canister receiving cylinder wherein each of said bumpers is configured to inhibit said outwardly facing surface from frictionally engaging the vehicle; and
an extension unit being coupled to said tube, said extension unit selectively extending said canister receiving cylinder outwardly from said tube when said canister is delivered into said canister receiving cylinder wherein said extension unit is configured to position said canister receiving cylinder within reach of the vehicle, said extension unit comprising:
a first plate having a top surface and a bottom surface, said first end corresponding to said first half of said tube extending through said top surface and said bottom surface, said first plate extending forwardly away from said tube,
a pair of first tracks, each of said first tracks being coupled to said bottom surface of said first plate, said first tracks extending forwardly away from said tube, said canister receiving cylinder slidably engaging each of said first tracks,
a second plate having an upper surface and a lower surface, said second end corresponding to said second half of said tube extending through said lower surface and said upper surface, said second plate being aligned with and being spaced from said first plate,
a pair of second tracks, each of said second tracks being coupled to said upper surface of said second plate, said second tracks being aligned with and being coextensive with said first tracks, said canister receiving cylinder slidably engaging each of said second tracks,
a housing being coupled between each of said first plate and said second plate, said housing extending rearwardly away from said tube, said housing having a front side and a back side, and
a pair of pistons, each of said pistons being positioned within said housing, each of said pistons being coupled to said back side, each of said pistons having a distal end with respect to said back side, said distal end corresponding to each of said pistons being coupled to said rearwardly facing surface of said canister receiving cylinder, each of said pistons selectively urging said canister receiving cylinder forwardly on each of said first plate and said second plate, each of said pistons selectively urging said canister receiving cylinder rearwardly on each of said first plate and said second plate such that said canister receiving unit is aligned with said tube.

\* \* \* \* \*